United States Patent [19]
Tronolone et al.

[11] Patent Number: 5,416,586
[45] Date of Patent: May 16, 1995

[54] METHOD OF TESTING ASPHERICAL OPTICAL SURFACES WITH AN INTERFEROMETER

[75] Inventors: Mark J. Tronolone, Fairport; Jon F. Fleig, Rochester, both of N.Y.; Chunsheng Huang, San Jose, Calif.; John H. Bruning, Pittsford, N.Y.

[73] Assignee: Tropel Corporation, Fairport, N.Y.

[21] Appl. No.: 138,243

[22] Filed: Oct. 15, 1993

[51] Int. Cl.6 ................................................ G01B 9/02
[52] U.S. Cl. .................................... 356/359; 356/360
[58] Field of Search ........................ 356/359, 360, 345

[56] References Cited

U.S. PATENT DOCUMENTS 4,743,117  5/1988  Kitabayashi et al. ................ 356/360
4,872,755  10/1989  Kuchel .
5,004,346  4/1991  Kühel ................................ 356/360

OTHER PUBLICATIONS

"Subaperture Testing of Aspheres with Annular Zones" by Ying-Moh Liu, George N. Lawrence and Christ L. Koliopoulos, Optical Sciences Center, University of Arizona, Tucson, Ariz., 37 pages, Jan. 1988.
"Method for subaperture testing interferogram reduction" by Weng W. Chow and George N. Lawrence, Optics Letters, vol. 8, No. 9, Optical Society of America, Sep. 1983, pp. 468–470.

*Primary Examiner*—Samuel A. Turner
*Attorney, Agent, or Firm*—Eugene Stephens & Associates

[57] ABSTRACT

A Fizeau interferometer (10) producing spherical test and reference wavefronts (34 and 36) is operated with a linear translator (50) for making a sequence of subaperture measurements of an aspherical test surface (40). Separate phase maps (88 and 90) are assembled at different focus positions (54 and 56) along a common optical axis (52) of the interferometer (10) and aspherical test surface (40). Respective null zones (92 and 94) are isolated from the phase maps (88 and 90) and are combined to form a composite phase map (100) defining differences between the aspherical test surface (40) and a family of spheres.

24 Claims, 4 Drawing Sheets

METHOD OF TESTING ASPHERICAL OPTICAL SURFACES WITH AN INTERFEROMETER

TECHNICAL FIELD

The invention relates to the field of interferometry and, in particular, to the measurement of aspherical optical surfaces using interference phenomena of light.

BACKGROUND

Individual aspherical optical elements can be used to replace complex optical systems made up of several conventional components having spherical or plano surfaces. The reduction in the number of optical components increases transmissive efficiency and reduces cumulative errors caused by the design, fabrication, and alignment of the additional components. Specially shaped aspherical optical elements can also be used to correct spherical aberrations and other optical defects.

However, aspherical optical elements are difficult and expensive to test, especially to high accuracy. Ordinarily, interferomic inspection systems are assembled with null lenses that transform nominal spherical wavefronts into aspheric wavefronts to test aspherical optical elements. However, the null lenses present similar challenges to testing as do the aspheres themselves.

Accuracy of the null lenses is limited by manufacturing and alignment tolerances of the optical elements needed to produce the aspherical wavefront. For example, accuracies better than one-fiftieth of a wavelength of a conventional helium-neon laser are difficult to reproduce with state-of-the-art inspection systems. In addition, a unique null lens design is required for testing each different asphere.

Spherical wavefronts can be produced with much higher accuracy and can be used to measure some aspherical elements that depart only slightly from sphericity. However, when the difference between an aspherical test surface and a spherical reference surface is large, the resulting interference pattern does not accurately represent the difference in the shape between the two surfaces.

A paper entitled "Subaperture Testing of Aspheres with Annular Zones" by Ying-Moh Liu et al. of the University of Arizona proposes the combination of several subaperture measurements using spherical wavefronts into a full aperture measure of an aspherical test element. The subaperture measurements are made in successive steps by focusing the spherical wavefront in different positions along the optical axis of the aspherical test element. Each focus position produces a different interference pattern. Annular zones having well-spaced fringe patterns are defined within the interferograms for separately measuring different portions of the aspherical test element. Interferometric data reduction techniques are used to obtain polynomial coefficients describing each annular zone, and further mathematical processing is used to obtain coefficients representing the full aperture of the test element.

However, the mathematical processing requires estimates of the center and diameter of the annular zones as well as of the full aperture. Boundaries of the annular zones are determined largely by visual inspection, leading to errors in these estimates for the center and diameter. The mathematical representations of each subaperture are also sensitive to reductions in subaperture sizes, which further limits overall accuracy of the measurement. Independent graphical comparisons of phase measurements from the interferograms to a desired form of the test element are not possible.

SUMMARY OF INVENTION

Our invention improves the accuracy at which aspherical optical elements can be measured with interferomic systems. Complicated null lens systems are avoided and mathematical approximations are minimized by improving the processing of information gathered by a sequence of subaperture measurements.

The aspherical test elements are measured in a null condition against a spherical reference wavefront by translating the aspherical test elements with respect to a focus of a spherical test wavefront in discrete steps along the optical axis of the aspherical elements. Interferometric measurements of phase differences between the test and reference wavefronts are limited at each step to subapertures corresponding to substantially retroreflected portions of the test wavefront. Variations between the subaperture measurements attributable to the change in measurement positions are discounted, and a composite phase map is assembled from the discounted subaperture measurements.

The composite phase map records the measured phase differences as departures from sphericity. Aberrations in the test element can be identified by comparing the composite phase map to a theoretical phase map representing a difference between the desired form of the test element and a sphere. Thus, instead of replacing the measured data of each subaperture measure with a more limited mathematical representation and combining the limited mathematical representations into a mathematical approximation of the test element, our invention changes the desired mathematical definition of the test element into a substantially equivalent form for making a more direct comparison with the measured data. Graphical or mathematical comparisons can be made between the composite phase map and a modified representation of the desired test element.

Preferably, our invention is practiced by aligning the aspherical surface of a test element with an objective of an interferometer in a first relative position along a common optical axis of the aspherical surface and the interferometer. A series of interferomic measures are made between a pair of test and reference wavefronts for assembling a first phase map of the aspheric surface. A null zone corresponding to substantially retroreflected portions of the first test wavefront is isolated from the first phase map.

The test element is then translated along the common optical axis to a second position for taking a second series of interferomic measures. The second series of interferomic measures is assembled into a second phase map, and a null zone is isolated from the second phase maps. Areas of overlap between the null zones of the first and second phase maps are respectively evaluated for differences that relate to the translation of the test element along the common optical axis. The first and second null zones are modified to remove these differences, and the modified null zones are combined into a composite phase map for measuring contiguous areas of the aspherical surface. This process is repeated until the composite phase map is equal to an area corresponding to the full aperture of the aspherical surface.

A lens design equation representing the desired form of the aspherical surface is modified by subtracting the mathematical representation of a sphere. The resulting difference surface equation can be used to calculate a theoretical phase map for graphical comparison with the composite phase map of the aspherical surface. Alternatively, the composite phase map can be approximated by an equation for a mathematical comparison with the difference surface equation. The comparisons reveal aberrations in the aspherical surface which depart from the desired surface.

Our invention also provides for fitting equations to the individual subaperture phase maps, but not for the purpose of replacing the measured phase data. Instead, the fitted equations are used to determine approximate gradients of phase map points to identify null zones of the phase maps within which departures from sphericity (i.e., departures from retroreflection) are limited. Phase data points above a predetermined threshold gradient are discarded, and only the remaining null zones of the subaperture phase maps are combined to form the composite phase map.

The null zones are combined by a number of novel steps that include evaluating overlapping areas between them. Any differences between the overlapped areas are assumed to be primarily the result of the change in position between the successive measures. Polynomial equations having a form appropriate for describing the change in position, but not higher order characteristics, are fitted to both overlapping areas. The fitted polynomial equations are then subtracted from the respective null zones. Any remaining differences between the overlapping areas are averaged, and the adjusted null zones are combined into a composite phase map.

The remaining differences between the overlapping areas, referred to as "residuals" can be used to monitor system errors. For example, the residuals describe both propagation errors, which can be reduced by lowering the threshold gradient and displacement errors, which can be reduced by correcting the movement of the test element along its optical axis.

The composite phase map references the aspherical test surface in measures of its differences from a family of spheres. These measures are not directly comparable to a desired theoretical surface for the test element. Accordingly, a lens designer equation describing the desired theoretical surface is contrasted with an equation of a sphere for producing a theoretical phase map that can be compared with the composite phase map for determining errors in the aspherical test surface.

DRAWINGS

DETAILED DESCRIPTION

Figure 1:
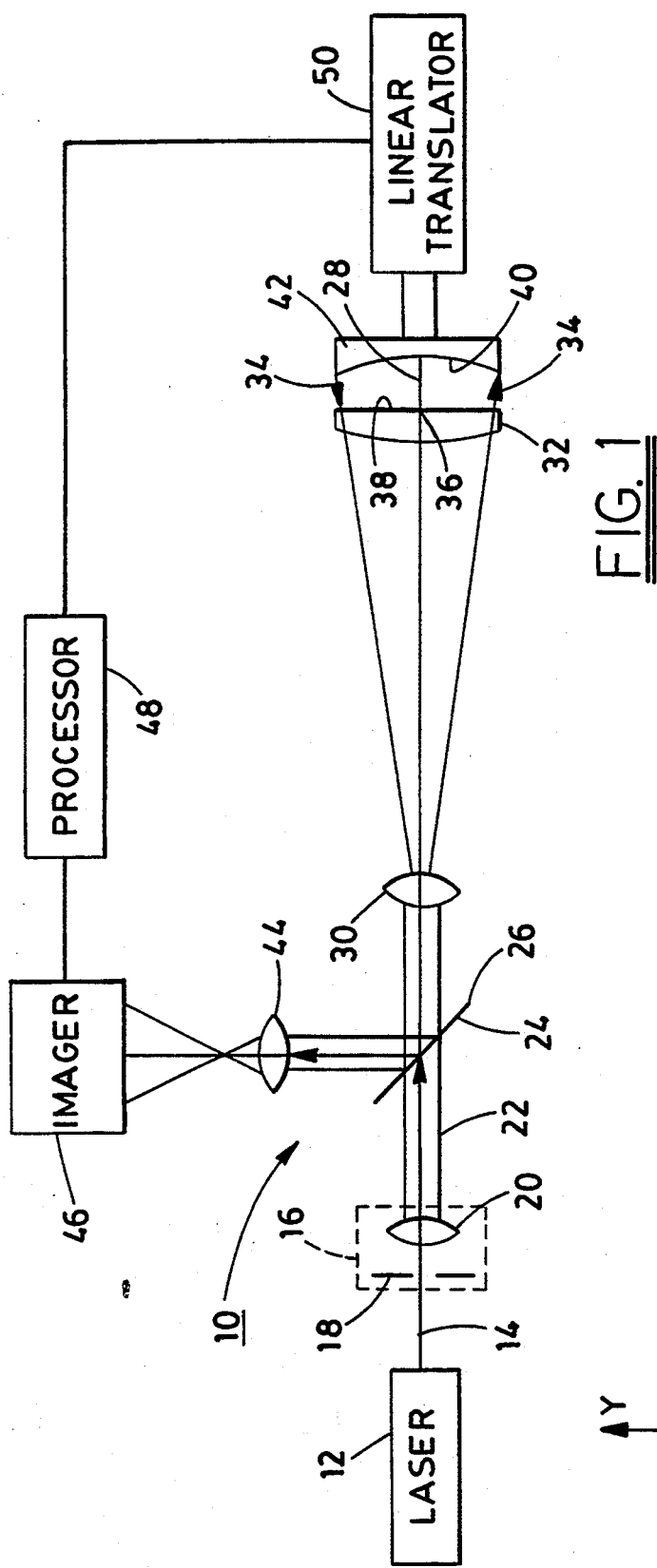
FIG. 1 is a schematic diagram of a Fizeau interferometer arranged in accordance with our invention for measuring an aspherical test surface.

A Fizeau interferometer 10, shown schematically in FIG. 1, includes a helium-neon laser 12 that emits a beam 14 of coherent light. A collimator 16, including a spacial filter 18 and a lens assembly 20, transforms the beam 14 into a parallel beam 22 having a roughly circular cross section.

The parallel beam 22 passes through a transmissive surface 24 of a beamsplitter 26 and is transformed into a spherical wavefront 28 by upper and lower objectives 30 and 32. The spherical wavefront 28, which includes initially coincident test and reference wavefronts 34 and 36, emerges from a final surface 38 (i.e., Fizeau surface) of the lower objective 32 as the test wavefront 34 and impinges against an aspherical surface 40 of a test element 42. Reflected portions of the test wavefront 34 returning from the aspherical surface 40 form an optical interference pattern with the reference wavefront 36 on the Fizeau surface 38.

A reflective surface 25 of the beamsplitter 26 directs portions of the returning test and reference wavefronts 34 and 36 to a focusing system 44 that forms an image of the Fizeau surface 38 within an imager 46, such as a charge-coupled device camera. Sensors (not shown) within the camera 46 make discrete measurements of image intensity. A computer processor 48 combines multiple phase-shifted measurements of image intensity to form a phase map that records phase differences between the test and reference wavefronts 34 and 36 in a predetermined matrix of positions.

Figure 2:
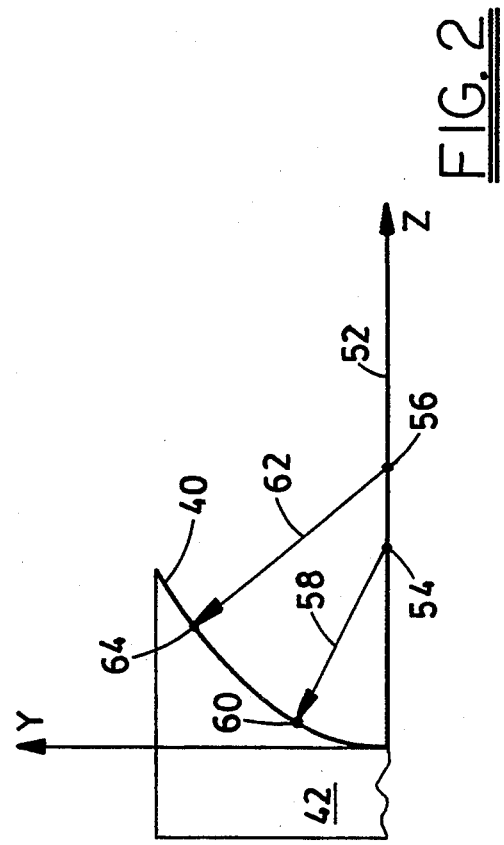
FIG. 2 is a schematic diagram referencing two different measurement positions of the aspherical test surface along a common optical axis of the interferometer and the aspherical test surface as an equivalent change in the focus of the interferometer with respect to the aspherical test surface.

A linear translator 50 controlled by processor 48 provides for relatively moving the test element 42 along a common optical axis 52 of the interferometer 10 and the test element 42. FIG. 2 compares two different positions of the test element 42 along the common optical axis 52, which is also referenced as a "z" axis. However, for simplicity of illustration, the test element 42 is considered stationary and a focus of the spherical test wavefront 34 is moved to depict equivalent changes in position.

Between the two positions, the focus of the spherical test wavefront 34 is moved from a position 54 to a new position 56 along the common optical axis 52. In the focus position 54, a ray 58 of the test wavefront 34 is retroreflected from a position 60 on the aspherical surface 40 of the test element. In the focus position 56, a longer ray 62 is retroreflected from a position 64. Distances between the positions 60 and 64 along the referenced "y" axis represent a change in aperture.

Figure 3:
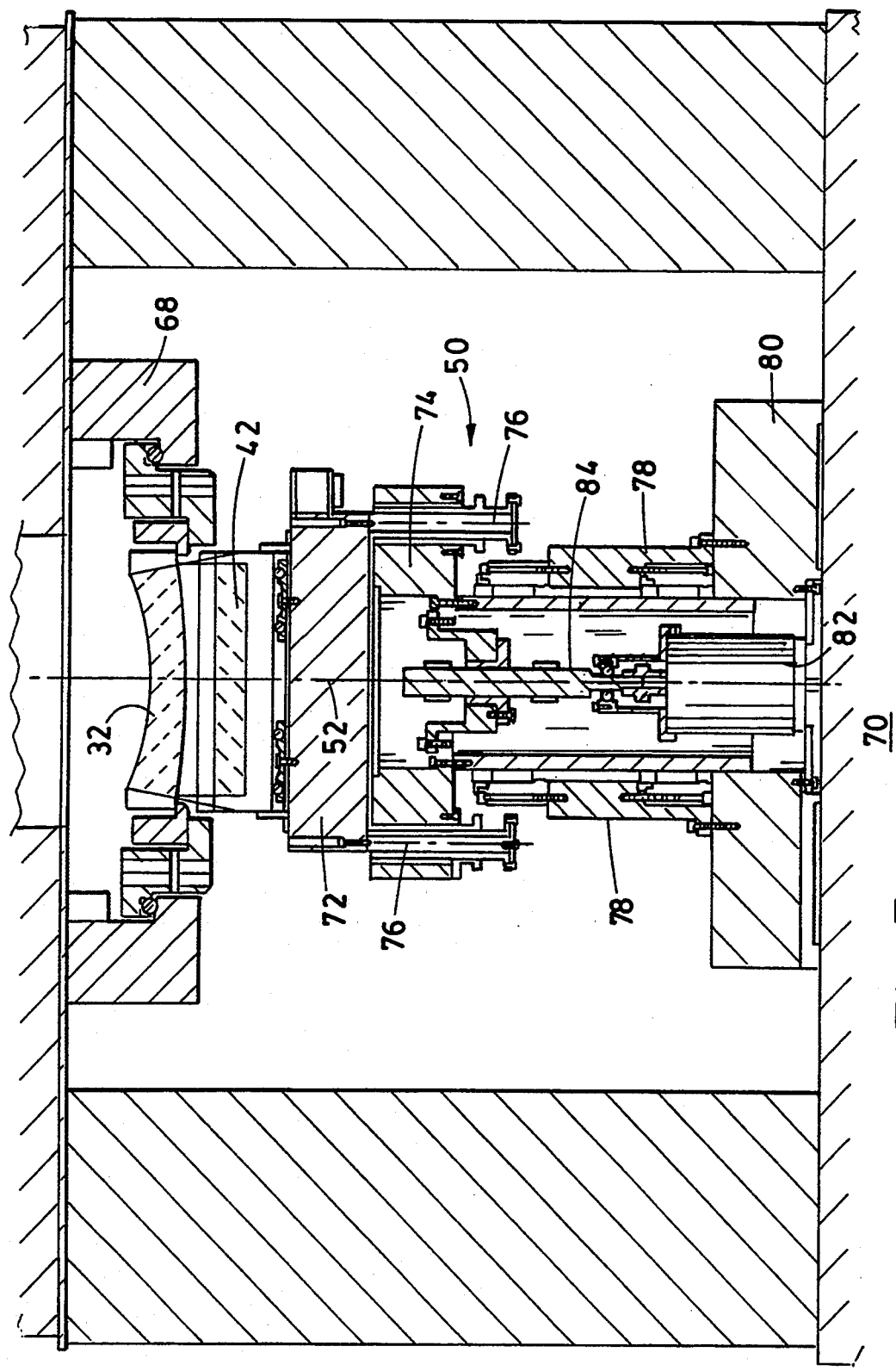
FIG. 3 is a more detailed front elevational view of the interferometer of FIG. 1 partly in section showing apparatus for moving the aspherical test surface along the common optical axis.

A more detailed view of a portion of the Fizeau interferometer 10, including the linear translator 50 for moving the aspherical test element 42 along the common optical axis 52, is shown in FIG. 3. The lower objective 32 is mounted in a holder 68 that is supported in a fixed position above a granite base 70. The test element 42 is mounted on a fixture 72 that is supported above an adjustable stage 74 by three piezo translators 76 spaced 120 degrees apart about the common optical axis 52. The three piezo translators 76 provide for performing conventional phase-shifting operations for producing phase maps from interferograms.

The adjustable stage 74 is guided for movement through much longer distances along the common axis 52 by uprights 78 that project above a granite annulus 80 on the base 70. Movement of the adjustable stage 74 is imparted by a stepping motor 82 that is fixed to the granite annulus 80. A leadscrew 84 rotated by the stepping motor 82 engages the adjustable stage 74 for precisely translating the test element 42 to vary retroreflections of the test wavefront 34 along caustics of the aspherical surface 40 from its paraxial focus to focus positions corresponding to its maximum aperture.

Figure 4A:
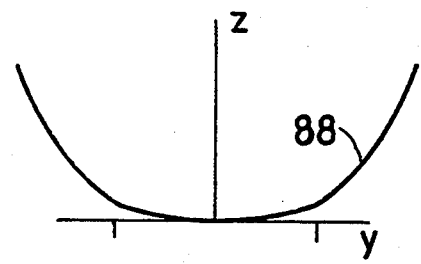
FIGS. 4a-4e are a series of graphical diagrams showing how two phase maps produced at the different measurement positions are combined to produce a composite phase map.
Figure 4B:
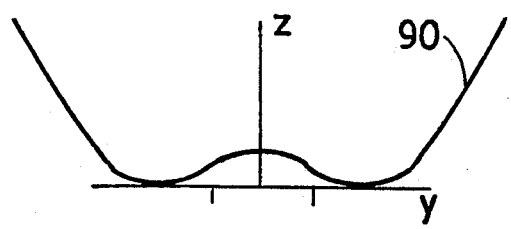

FIGS. 4a–4e graphically depict how two overlapping phase maps 88 and 90 of the aspherical surface 40 are combined to produce a composite phase map 100. Each of the phase maps 88 and 90 shown in FIGS. 4a and 4b is a matrix of points having magnitudes representing phase differences between the test and reference wavefronts 34 and 36 measured at two different locations along the common axis 52. The phase maps 88 and 90 measure how much the aspherical surface 40 differs from two differently sized spheres.

Figure 4C:
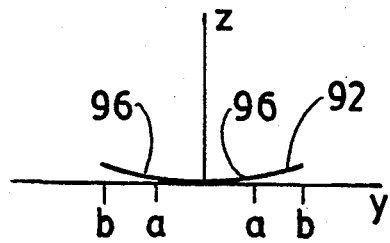
Figure 4D:
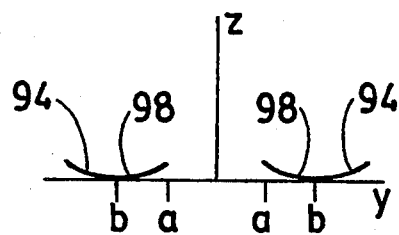
Figure 4E:
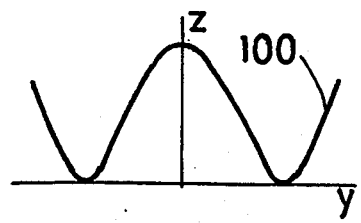

However, only limited null zones 92 and 94 of the phase maps 88 and 90 accurately measure these differences, because fringe spacing in the underlying interferograms is compressed by any large differences. FIGS. 4c and 4d show the null zones 92 and 94 within which the phase maps 88 and 90 exhibit a predetermined accuracy. The null zones 92 and 94 are identified by fitting well-known Zernike polynomials to the entire matrices of points within the phase maps 88 and 90 using conventional mathematical techniques, such as the method of "least squares". Gradients are calculated at each of the points and compared to a threshold gradient for identifying subsets of points (i.e., the null zones) that correspond to substantially retroreflected portions of the respective test wavefronts.

The null zones 92 and 94 overlap within respective annular areas 96 and 98, which are located between an inner diameter "a—a" and an outer diameter "b—b". Although the overlap areas 96 and 98 measure the same region of the aspherical surface 40, the measures are not directly comparable because the two areas are measured with respect to different spheres.

However, any differences between measures of the two null zones 92 and 94 that are the result of the different spheres (i.e., the relative change in focus position along the common axis 52) can be described by a change in the Zernike alignment terms of piston, tilt, and focus. Accordingly, the differences can also be described by a second order polynomial equation of the following form:

$$z = A r^2 + B x + C y + D$$

where "z" is a measure along the common axis 52 and the term "$r^2$" is equivalent to "$x^2 + y^2$".

The polynomial equation for "z" is separately fit to the further subsets of points within the overlap areas 96 and 98 using conventional curve-fitting techniques. Once the coefficients of the respective polynomials are determined, the fitted equations are subtracted from the respective subsets of points that make up the null zones 92 and 94. The modified null zones 92 and 94 are combined to form the composite phase map 100 shown in FIG. 4e. Any remaining differences between the modified overlap areas 96 and 98, which are referred to as "residuals", are averaged for making the combination.

The residuals provide a handy measure of system errors. For example, the residuals can be monitored to determine if the limited zones 92 and 94 are too large, requiring the gradient threshold to be reduced. In addition, the residuals detect positioning errors caused by linear or angular displacements of the adjustable stage 74 in the "x—y" plane.

Additional phase maps are measured and overlapping null zones are combined until the composite phase map 100 corresponds to the full aperture of the aspherical surface 40. However, the individual null zones are preferably combined in a hierarchy depicted in FIG. 5 to give more even weight to each phase map.

Figure 5:
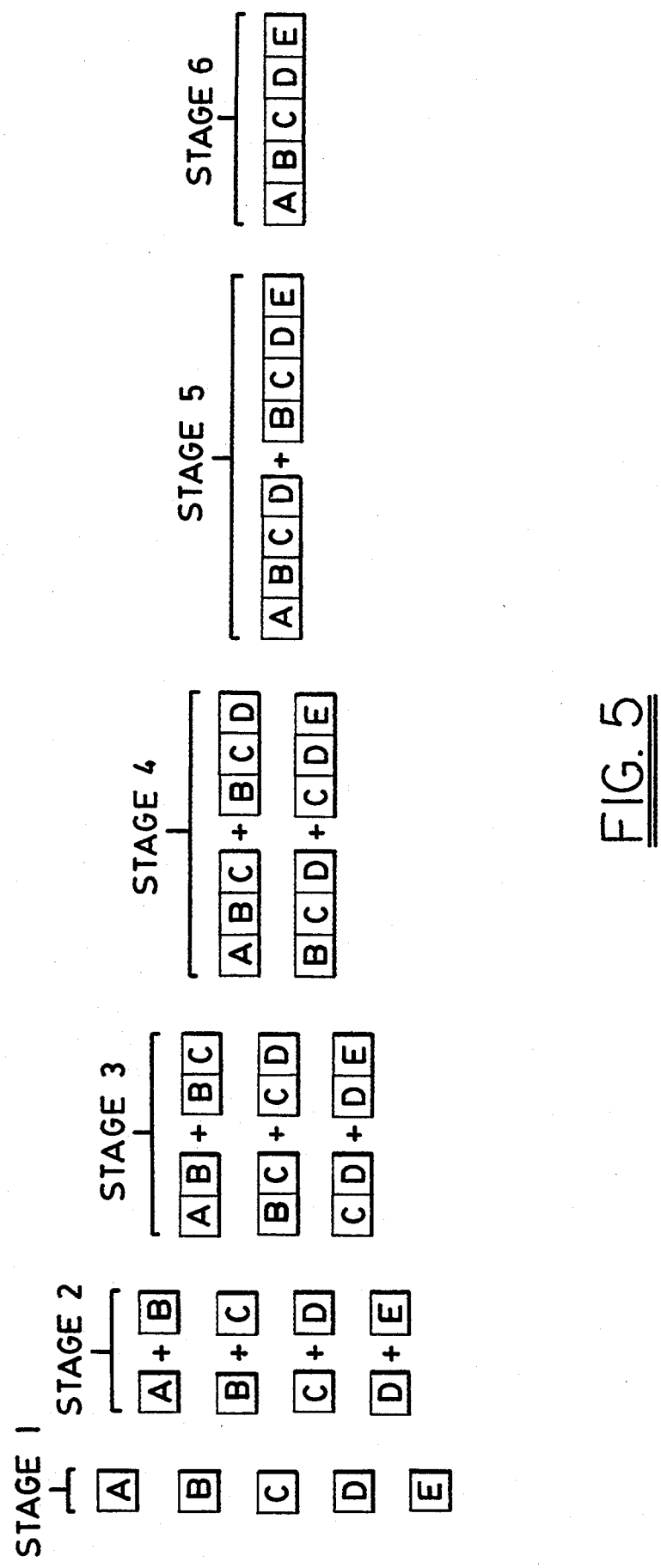
FIG. 5 is a diagram schematically depicting how a set of five phase maps are combined in a predetermined hierarchy to produce the composite phase map.

FIG. 5 shows a progression of six stages from left to right for combining five individual null zones labeled "A—E". Stage 1 represents the original five null zones prior to any modification. In Stage 2, adjacent original null zones are combined by modifying the null zones to discount differences attributable to changes in piston, tilt, and focus. For example, the original null zone "B" is separately modified for combination with original null zone "A" and with original null zone "C", creating overlapping subcomposite zones "AB" and "BC". The succeeding Stages 3 through 5 progressively combine the overlapping subcomposite zones in a similar manner until all of the null zones "A-E" have been combined into a single composite phase map "ABCDE" at Stage 6.

The composite phase map is a measure of multiorder differences between the aspherical surface 40 and a family of spheres, discounting the differences between the spheres. Accordingly, the composite phase map is neither a direct measure of errors in the aspherical surface nor directly comparable to a desired theoretical surface. For obtaining such a comparison, the desired theoretical surface must be similarly referenced with respect to a theoretical sphere, discounting the lower order influences relating to the choice of sphere.

For example, a lens designer "sag" equation in polynomial form describing the desired surface can be contrasted with the equation of a sphere for producing a theoretical phase map of the difference. Conventional lens design polynomials are described in *Optical Shop Testing*, Daniel Malacara, ed., John Wiley and Sons, 1978, Appendix 1, pages 479–487. Zernike polynomials can be fitted to both the composite phase map and the theoretical phase map, and the radially symmetric terms (other than the focus term) can be compared for identifying multiorder errors in the aspherical surface 40. Wavefront fitting with Zernike polynomials is described in the same reference in Appendix 2, pages 489–505.

Alternatively, the theoretical phase map itself can be modified similar to the composite phase map to discount for effects associated with the alignment terms of piston, tilt, and focus. After such modification, the theoretical and composite phase maps can be contrasted to form an error phase map for graphically depicting multiorder errors at corresponding points of the two phase maps.

We claim:

1. A method of measuring an aspherical surface with an interferometer comprising the steps of:
   aligning the aspherical surface and the interferometer in a first relative position along an optical axis of the aspherical surface;
   assembling a first map of the aspherical surface from measures of interference between a first pair of test and reference wavefronts;
   isolating a null zone of the first phase map substantially corresponding to retroreflected portions of the first test wavefront;

relatively shifting the aspherical surface and the interferometer along the optical axis to a second position;

assembling a second map of the aspherical surface from measures of interference between a second pair of test and reference wavefronts;

isolating a null zone of the second phase map substantially corresponding to retroreflected portions of the second test wavefront;

evaluating areas of overlap between the null zones of the first and second phase maps for differences relating to a change in focus between said first and second positions independently of the actual position of the aspherical surface with respect to the interferometer;

relatively modifying the null zones of the first and second phase maps to remove the differences relating to the change in focus; and combining the relatively modified null zones of the first and second phase maps into a composite phase map for measuring contiguous areas of the aspherical surface with substantially retroreflected portions of two test wavefronts.

2. The method of claim 1 in which the two reference wavefronts are spherical wavefronts.

3. The method of claim 2 in which the respective spherical wavefronts are focused on the optical axis of the aspherical surface at the first and second relative positions between the aspherical surface and the interferometer.

4. The method of claim 1 in which said steps of assembling first and second maps include assembling matrices of points having magnitudes representing phase differences between the respective pairs of test and reference wavefronts.

5. The method of claim 4 in which said steps of isolating the null zones of the first and second phase maps include fitting respective mathematical surface equations to the matrices of points, calculating gradients of the mathematical surface equations corresponding to the matrices of points, and excluding points from the matrices at which the gradients are above a predetermined threshold.

6. The method of claim 5 including the further steps of comparing the areas of overlap between the modified null zones for residual differences and adjusting the predetermined threshold to minimize the residual differences.

7. The method of claim 5 in which the mathematical equations are Zernike polynomials.

8. The method of claim 1 in which said step of evaluating areas of overlap includes fitting separate equations, each capable of representing a change in focus, to the respective areas of overlap between the null zones of the first and second phase maps.

9. The method of claim 8 in which the separate equations are second order equations capable of representing discontinuity between the null zones of the first and second phase maps caused by differences in piston, tilt, and focus.

10. The method of claim 9 in which said step of relatively modifying the null zones includes subtracting the separate equations from the respective null zones of the first and second phase maps.

11. The method of claim 10 in which said step of combining the relatively modified null zones includes averaging values of the points within the overlapping areas of the null zones.

12. The method of claim 1 including the further steps of:

comparing a desired mathematical representation of the aspherical surface to a theoretical surface that is normal to the two reference wavefronts;

assembling a theoretical phase map of differences between the desired mathematical representation of the aspherical surface and the theoretical surface; and comparing the composite phase map to the theoretical phase map for identifying second and higher order errors in the aspherical surface.

13. The method of claim 12 in which the theoretical surface is a sphere.

14. The method of claim 13 in which the desired mathematical representation is in the form of a polynomial equation.

15. The method of claim 14 in which said step of comparing the composite phase map to the theoretical phase map includes fitting polynomial equations to both the composite phase map and the theoretical phase map and comparing radially symmetric terms other than focus terms to quantify errors.

16. A method of operating an interferometer to measure errors in aspherical optical surfaces comprising the steps of:

aligning an aspherical test surface with an objective of the interferometer along a common optical axis of the interferometer;

producing a first pair of spherical test and reference wavefronts having a focus located in a first position along the common optical axis;

constructing a first phase map of the aspherical test surface in measures of phase differences between the first test and reference wavefronts;

isolating a first null zone within the first phase map corresponding to substantially retroreflected portions of the first test wavefront;

relatively shifting the aspherical test surface with respect to the interferometer along the common optical axis;

producing a second pair of spherical test and reference wavefronts having a focus located in a second position along the common optical axis;

constructing a second phase map of the aspherical test surface in measures of phase differences between the second test and reference wavefronts;

isolating a second null zone within the second phase map corresponding to substantially retroreflected portions of the second test wavefront;

combining the first and second null zones into a composite phase map measuring differences between the aspherical test surface and a family of spheres;

referencing a desired theoretical surface as a theoretical phase map measuring differences between the desired theoretical surface and a theoretical sphere; and contrasting the composite phase map from the theoretical phase map for determining errors in the aspherical test surface.

17. The method of claim 16 in which said step of combining the first and second null zones includes the step of evaluating areas of overlap between the first and second null zones to determine differences attributable to the change in focus positions along the common optical axis independently of the actual position of the focus along the common optical axis.

18. The method of claim 17 in which said step of combining also includes modifying the first and second null zones to discount for the determined differences attributable to the change in focus positions.

19. The method of claim 18 in which a third null zone is similarly isolated from a third phase map of the aspherical test element.

20. The method of claim 19 including the further steps of evaluating areas of overlap between the second and third null zones, modifying the second and third null zones to discount for differences attributable to a change in focus positions, and combining the second and third null zones.

21. The method of claim 20 including the further step of combining the combined first and second null zones with the combined second and third null zones for further defining the composite phase map.

22. The method of claim 16 in which said step of contrasting the composite phase map from the theoretical phase map includes fitting respective mathematical surface equations to the two maps and comparing coefficients of like terms that are not directly affected by the shift in focus positions along the common optical axis.

23. The method of claim 16 in which both the composite phase map and the theoretical phase map are discounted for differences attributable to the shift in focus positions along the common optical axis and said step of contrasting the composite phase map from the theoretical phase map includes forming an error phase map recording differences between the composite and theoretical phase maps.

24. The method of claim 16 in which said step of referencing a desired theoretical surface as a theoretical phase map includes contrasting an equation describing the desired theoretical surface with the equation for a sphere.

* * * * *